LINE-FINDER STOPPING CIRCUIT

Filed Dec. 22, 1948

INVENTOR.
ROBERT BERTHOLD BUCHNER
BY Fred M Vogel
AGENT.

Patented Dec. 8, 1953

2,662,119

UNITED STATES PATENT OFFICE 2,662,119

LINE-FINDER STOPPING CIRCUIT

Robert Bertold Buchner, Eindhoven, Netherlands, assignor to Hartford National Bank and Trust Company, Hartford, Conn., as trustee Application December 22, 1948, Serial No. 66,679

Claims priority, application Netherlands January 8, 1948

7 Claims. (Cl. 179—18)

This invention relates to circuit-arrangements of automatic signalling systems, for example telephone systems, for finding any one out of a number of lines, an individual contact being allotted to each line in at least one test switch and the contact of the line to be found exhibiting a direct-current potential which is different from the potentials of the other contacts.

Such circuit-arrangements are used, for example, in an automatic telephone system comprising line finders. After a subscriber has lifted the telephone from the hook, the c-contacts corresponding to the subscriber's line concerned and included in the contact banks of a number of line finders are characterized by a predetermined potential. Furthermore, the line finders are switched-in, their contact arms moving over the contact banks until the contact arm of one of the line finders engages the characterized c-contact and stops. In this case there is a great possibility, especially when the line finders are driven centrally, that two or more line finders may stop on corresponding contacts simultaneously.

This disadvantage is mitigated in the circuit-arrangement according to the invention, which exhibits the characteristic that, when the test switch is switched-in, the contact arm of this switch is connected to an electrode of a cut-off discharge tube, which is connected to a second discharge tube in such manner that, when one tube is cut-off, the other is rendered conductive, and conversely, and that, when the contact arm engages the contact of the line to be found, the cut-off tube is rendered conductive, in which event the potential of the said contact is substantially reduced to that of the other contacts, the movement of the test switch being stopped by means of an energising circuit of the stopping magnet thereof which is included in the output circuit of a further discharge tube.

Consequently, in the circuit-arrangement according to the invention, the characterising potential difference is eliminated by electronic means as soon as one of the test switches has reached the characterized contact, so that a second test switch is in practice not capable of stopping on a corresponding contact.

The invention will now be explained more fully by reference to the accompanying drawing, in which corresponding elements in the figures are identified by like reference numerals. In the drawing.

Figure 1:
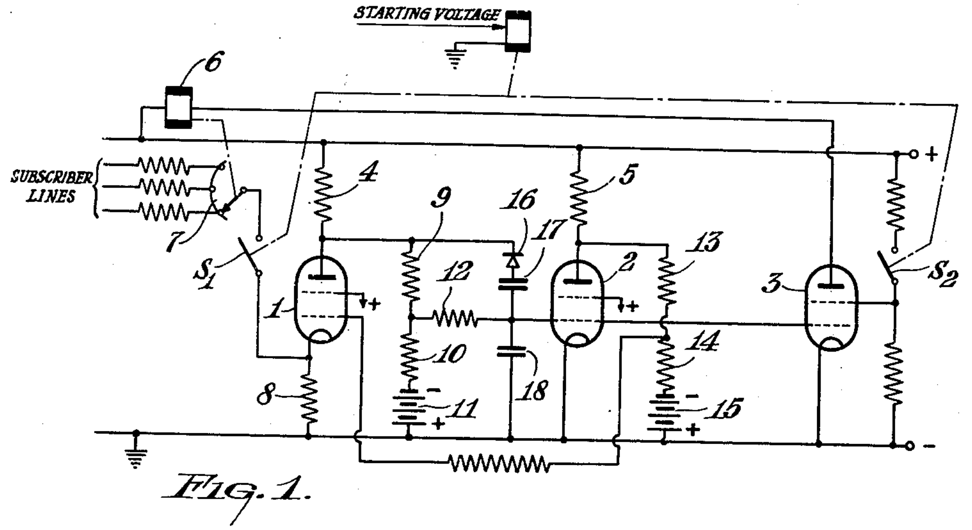
Fig. 1 is a schematic diagram of a first preferred embodiment of the invention.

The circuit-arrangement shown in Fig. 1 comprises three discharge tubes 1, 2 and 3, which are fed by way of resistances 4 and 5 and an energising coil 6 of the stopping magnet of a test switch 7. The cathode lead of tube 1 includes a high-ohmic resistance 8 and the cathode of the said tube may be connected through a contact $S_1$ to the contact arm of test switch 7. Furthermore the series-combination of two resistances 9 and 10 and a battery 11 is connected to the anode of tube 1. The control grid voltage for tube 2 is derived by way of a resistance 12 from the said series-combination which fulfills the function of a potentiometer circuit. The control-grid voltage for tube 1 is derived from a potentiometer circuit connected between the anode and the cathode of tube 2 and including resistances 13 and 14 and a source of supply 15. Tube 3 takes its control-grid voltage directly from the control-grid voltage of tube 2. The screen-grid voltage of tube 3 may be switched-in by means of a switch $S_2$.

The operation of the circuit-arrangement is as follows:

By means of a relay S, which may be energised, for example, when a subscriber's telephone is lifted off the hook, the test circuit is made operative owing to closure of the contacts $S_1$ and $S_2$.

The cathode of tube 1 is in this case connected to the contact arm of test switch 7, the screen-grid voltage required for tube 3 being supplied via the contact $S_2$. At the moment of switching-in and also the time before, the tube 1 is cut-off due to the negative bias-voltage derived from the output circuit of tube 2. The latter is conductive, so that the grid of tube 1 exhibits, for example, a negative voltage of −20 volts. The control grid of tube 3 is connected directly to the control grid of tube 2, so that tube 3 is rendered conductive immediately upon applying the screen-grid voltage and the stopping magnet of test switch 7 is energised by the energising coil 6.

The contact arm of the test switch is now scanning contacts. The contact to be found has, for example, a negative voltage of −30 volts the other contacts exhibiting substantially earth potential. As long as the contact arm successively scans undesired contacts, the cathode of tube 1 is thus substantially connected to earth and tube 1 is cut-off due to the negative voltage at the control grid. If, however, the contact arm engages the characterized contact, the cathode of tube 1 becomes negative with respect to the control grid of this tube, so that tube 1 is rendered conductive. Consequently, the voltage at the junction of the resistances 9 and 10 decreases and tubes 2 and 3 are cut-off, so that the contact arm of the test switch stops due to the stopping magnet of this switch now being no longer energised.

Owing to the cutting-off of tube 2, the voltage at the junction of the resistances 13 and 14 increases and this to a value such that the potential of the control grid of tube 1 substantially corresponds to earth potential, so that the potential of the cathode of the said tube also substantially corresponds to earth potential and hence to the potential of the non-characterized contacts. The characterising potential of the contact of the line to be found is thus eliminated substantially without inertia, so that double test when use is made of a plurality of test switches and multiple through-connected contact banks is in practice impossible.

For the sake of completeness it may be mentioned that the batteries 11 and 15 serve for suitable adjustment of the grid voltage of the tubes and for providing earth potential at the control grid of tube 1 when tube 2 is cut-off.

Since in the test switch there is a possibility of the contact arm vibrating on the contacts, steps have been taken in the circuit-arrangement to ensure that in the case of a transient interruption of the connection between the contact arm and the contact to be found the blocking control-grid voltage of tube 1 does not return immediately.

For this purpose the anode of tube 1 is in addition connected through the series-combination of a rectifier 16, preferably a blocking-layer rectifier, and a condenser 17 to the control grid of tube 2. The blocking-layer cell 16 is so connected that the decrease in anode voltage of tube 1 is immediately transferred to the control grid of tube 2. In the reverse direction, however, the rectifying cell exhibits a very high resistance, so that an increase in control-grid voltage of tube 2 will take place but slowly and is determined by the time-constant of the resistances 9 and 12, together with the grid capacity 18 of tube 2. It is thus ensured that a reasonable time elapses between the elimination of the blocking voltage at the control grid of tube 1 and the return thereof.

In the circuit-arrangement shown in Fig. 1 we are confronted with the undesirable fact that a positive voltage is applied to the stopping magnet of the test switch. This disadvantage may be suppressed, however, with the use of either of the circuits shown in Figs. 2 and 3.

Figures 2, 3:
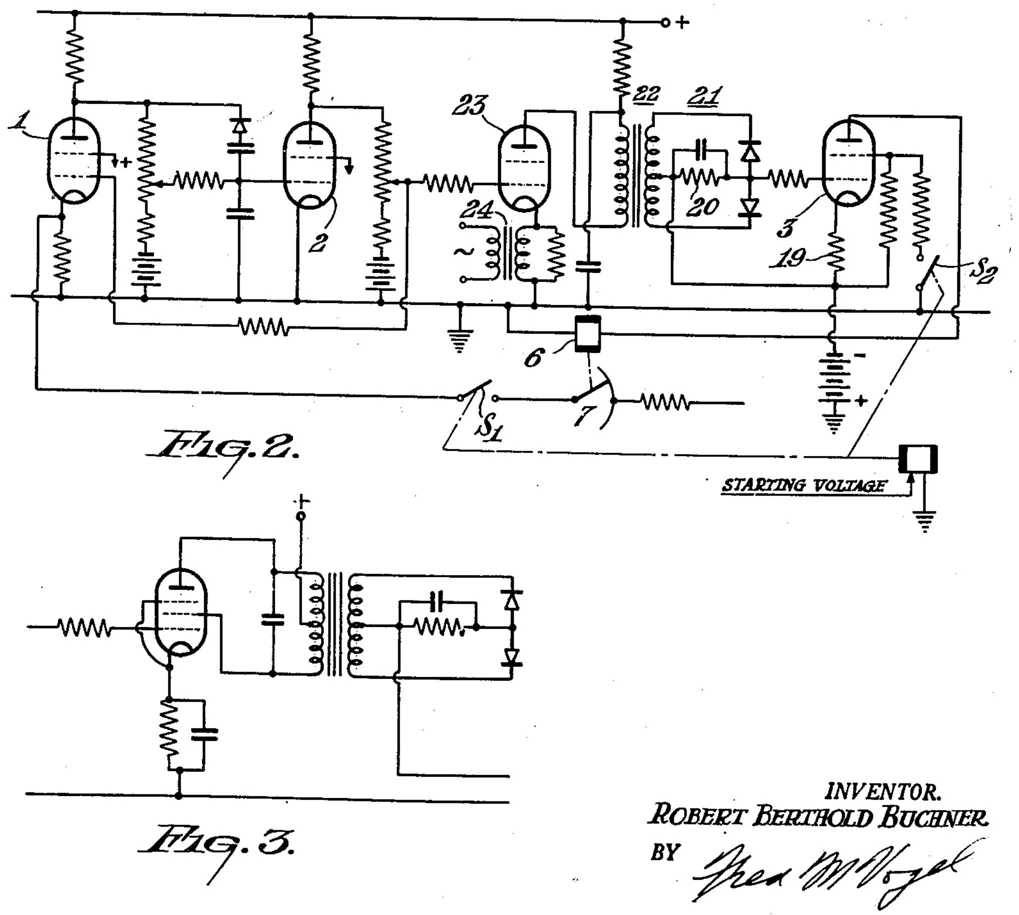
Fig. 2 is a schematic diagram of a second preferred embodiment of the invention.
Fig. 3 is a schematic diagram of a modification of Fig. 2.

The coupling between the discharge tubes 1 and 2 in the circuit-arrangement shown in Fig. 2 is identical with that of Fig. 1. In these arrangements, however, the energising circuit 6 of the stopping magnet of test switch 7 is, at one end, connected to earth. The cathode of tube 3 is connected by way of a resistance 19 to a negative supply voltage, while the screen grid may be connected via a contact $S_2$ to earth. The control-grid circuit of tube 3 includes a load resistance 20 of a rectifying circuit 21. This circuit is connected by way of a transformer 22 to the output circuit of a discharge tube 23. The cathode lead of tube 23 is supplied by way of a transformer 24 with a constant alternating voltage. The control-grid voltage of tube 23 is derived by way of a resistance 25 from the output circuit of tube 2.

If tube 2 is conductive, a negative voltage is set up at the potentiometer provided in the output circuit of this tube with the result that tube 23 is cut-off and the alternating voltage injected in the cathode lead is not transferred to the output circuit of tube 23. Consequently, a rectified voltage is not set up across the load resistance 20 of the rectifying circuit 21, so that tube 3 is conductive.

If tube 2 is cut-off, tube 23 is conductive and the load resistance of the rectifying circuit has produced across it a rectified voltage by means of which tube 3 is cut-off.

In the circuit-arrangement shown in Fig. 2 the following disadvantage may arise.

More particularly in automatic telephone systems it is undesirable to utilise a high-frequency voltage as the alternating voltage injected in the cathode lead of tube 23. If, therefore, an alternating voltage of 50 c./s. is chosen and if a ripple voltage should be avoided as much as possible during rectification, the time-constant of the resistance 20 and of the condenser connected parallel thereto should not be unduly small. However, this may result, upon conduction of tube 23, in a certain inertia in the setting up of the direct voltage across resistance 20.

In order to avoid this inertia, use may be made of a circuit of tube 23 as shown in Fig. 3.

Parallel to the anode-screen grid space of tube 23 is connected an oscillatory circuit 26, which is inductively coupled to the rectifying circuit 21.

When tube 23 is rendered conductive with the use of a voltage at the control grid which is supplied by way of the resistance 25, the circuit 26 is excited almost immediately. If this circuit is tuned to a high frequency, for example 500 kc./sec., the voltage required for cutting-off the subsequent tube 3 is found to be set up substantially without inertia across the resistance 20 of the rectifying circuit, the time-constant of which is now chosen to be much smaller.

Experiments with two circuit-arrangements according to the invention which have one test switch in common have revealed that at each instance only one of the circuits becomes operative and the other is automatically cut-off owing to the elimination of the characterizing potential of the contact to be found.

What I claim is:

1. In an automatic signalling system entailing a plurality of lines, apparatus for finding any one of said lines, the line to be found having established thereon a direct potential whose value differs with respect to the direct potentials on the other lines, said apparatus comprising a test switch having a series of fixed contacts, a contact arm for successively engaging said fixed contacts and an electromagnet for actuating said arm, each of said fixed contacts being connected to a respective line, a flip-flop circuit including first and second electron discharge tubes each having a cathode, a grid, and an anode, separate impedance means coupling the grid of the first tube to the anode of the second tube and the anode of the first tube to the grid of the second tube, respectively, and means coupled to the grid of the first tube to bias first tube to cut off, said circuit having two quiescent conditions, namely an initial condition in which said first tube is non-conductive and said second tube is conductive and an operative condition in which said first tube is conductive and said second tube non-conductive, means for passing an energization current through said electromagnet to actuate said arm, means to connect said arm to the cathode of said first tube whereby the potentials on said lines are successively applied thereto, said first tube being rendered conductive solely in response to the value of potential on said line to be found, whereby said second tube is rendered non-conductive, and a device coupled to said second tube and including means responsive upon the non-conduction of said second tube to interrupt said current flow through said electromagnet whereby said arm is arrested at the desired contact, the impedance means coupling the grid of the first tube to the anode of the second tube having a value at which during the non-conduction of said second tube, the voltage applied to the grid of the first tube gives rise to a potential on the cathode of the first tube marking busy the found line connected thereto.

2. In an automatic signalling system entailing a plurality of lines, apparatus for finding any one of said lines, the line to be found having established thereon a direct potential whose value is negative with respect to the direct potentials on the other lines, said apparatus comprising a test switch having a series of fixed contacts, a contact arm for successively engaging said fixed contacts and an electromagnet for actuating said arm, each of said fixed contacts being connected to a respective line, a flip-flop circuit including first and second electron discharge tubes each having a cathode, a grid, and an anode, first and second impedances connected across said first and second tubes respectively, the grid of the first tube being connected to a tap on said second impedance, the grid of the second tube being connected to a tap on said first impedance, and means coupled to the cathode of the first tube to bias first tube to cut off, said circuit having two quiescent conditions, namely an initial condition in which said first tube is non-conductive and said second tube is conductive and an operative condition in which said first tube is conductive and said second tube non-conductive, means for passing an energization current through said electromagnet to actuate said arm, means to connect said arm to the cathode of said first tube whereby the potentials on said lines are successively applied thereto, said first tube being rendered conductive solely by the value of negative potential on said line to be found, whereby said second tube is rendered non-conductive, and a device coupled to said second tube and provided with means responsive upon the non-conduction of said second tube to interrupt said current flow through said electromagnet whereby said arm is arrested at the desired contact, the voltage applied to the grid of the first tube from the tap on said second impedance in said operative condition decreasing to a potential substantially corresponding to that of the other lines whereby the cathode of the first tube assumes the same potential to mark busy the found line connected thereto.

3. An arrangement, as set forth in claim 2, further including a rectifier connected in series with a condenser between the anode of said first tube and the grid of said second tube.

4. In an automatic signalling system entailing a plurality of lines, apparatus for finding any one of said lines, the line to be found having established thereon a direct potential whose value is negative with respect to the direct potentials on the other lines, said apparatus comprising a test switch having a series of fixed contacts, a contact arm for successively engaging said fixed contacts and an electromagnet for actuating said arm, each of said fixed contacts being connected to a respective line, a flip-flop circuit including first and second electron discharge tubes each having a cathode, a grid, and an anode, means coupling the grid of the first tube to the anode of the second tube and the anode of the first tube to the grid of the second tube and means coupled to the grid of the first tube to bias said first tube to cut off, said circuit having two quiescent conditions, namely an initial condition in which said first tube is non-conductive and said second tube is conductive and an operative condition in which said first tube is conductive and said second tube non-conductive, a third electron discharge tube including a cathode, a grid and an anode, means to apply a positive potential to the anode of said third tube through said electromagnet, means interconnecting the grids of said second and third tubes, means coupled to said third tube for rendering said tube conductive thereby to energize said electromagnet and actuate said arm, means to connect said arm to the cathode of said first tube whereby the potentials on said lines are successively applied thereto, said first tube being rendered conductive solely by the value of negative potential on the line to be found, whereby said second and third tubes are rendered simultaneously non-conductive, the non-conduction of said third tube de-energizing said electromagnet and arresting said arm at the desired contact the means coupling the grid of the first tube to the anode of the second tube including an impedance whose value results in an alteration in the conduction of the first tube upon non-conduction of the second tube to an extent at which the resultant cathode potential at the first tube marks busy the found line coupled thereto.

5. In an automatic signalling system entailing a plurality of lines, apparatus for finding any one of said lines, the line to be found having established thereon a direct potential whose value is negative with respect to the direct potentials on the other lines, said device comprising a test switch having a series of fixed contacts, a contact arm for successively engaging said fixed contacts and an electromagnet for actuating said arm, each of said fixed contacts being connected to a responsive line, a flip-flop circuit including first and second electron discharge tubes each having a cathode, a grid and an anode, the grid of the first tube being coupled to the anode of the second tube and the grid of the second tube being coupled to the anode of the first tube, and means coupled to the grid of the first tube to bias said first tube to cut-off, said circuit having two quiescent conditions, namely an initial condition in which said first tube is non-conductive and said second tube is conductive and an operative condition in which said first tube is conductive and second tube non-conductive, means connecting said arm to the cathode of the first tube to render same conductive solely at the potential of the line to be found, said coupling between the grid of the first tube and the anode of the second tube including impedance means having a value at which during non-conduction of said second tube the voltage applied to the grid of the first tube gives rise to a cathode potential marking busy the found line connecting thereto, a third and fourth electron discharge tube each having a cathode, a grid and an anode, means to apply a positive potential to the anode of said third tube through said electromagnet, means to render said third tube conductive thereby to energize said electromagnet and actuate said contact arm, means coupling the anode of said second tube to the grid of said fourth tube to render said fourth tube conductive in the operative condition where said second tube is non-conductive, means to apply an alternating current to the cathode of said fourth tube, rectifying means coupled to the anode of said fourth tube to derive therefrom a control voltage in the condition where said fourth tube is conductive, means to apply said control voltage to the grid of said third tube to render said third tube non-conductive whereby said electromagnet is de-energized and said arm is arrested at the desired fixed contact.

6. An arrangement, as set forth in claim 5, wherein said fourth tube further includes a screen grid, a resonant circuit being connected between the anode and screen grid, whereby said fourth tube when rendered conductive generates an alternating voltage.

7. In an automatic signalling system, a circuit for testing and busying one of a plurality of lines any one of which has established thereon a direct potential whose value differs from the direct potential on the other lines, said apparatus comprising a flip-flop circuit provided with first and second electron discharge tubes and having two quiescent conditions, namely an initial position in which said first tube is non-conductive and said second tube conductive, and an operative condition in which the conduction of the tubes is reversed, means selectively to apply the potentials on said lines to an electrode of said first tube, said first tube being rendered conductive solely by the different potential value, whereby said second tube is rendered non-conductive, said flip-flop circuit including means intercoupling said first and second tubes and having an impedance at which during the non-conduction of said second tube it serves to alter the conduction of the first tube to an extent at which the resultant potential developed at said electrode substantially corresponding to the potential on the other lines.

ROBERT BERTOLD BUCHNER.

References Cited in the file of this patent

UNITED STATES PATENTS

| Number | Name | Date |
|---|---|---|
| 2,295,032 | Deakin | Sept. 8, 1942 |
| 2,351,016 | Deakin | June 13, 1944 |
| 2,354,668 | Deakin | Aug. 1, 1944 |
| 2,423,087 | De Vriendt | July 1, 1947 |
| 2,428,024 | Herbig | Sept. 30, 1947 |
| 2,454,781 | Deakin | Nov. 30, 1948 |
| 2,454,809 | Kurithot | Nov. 30, 1948 |